United States Patent Office

2,856,360
Patented Oct. 14, 1958

2,856,360

SUPERBASIC ALKALINE EARTH METAL SULFONATES

Raymond C. Schlicht, Wappingers Falls, N. Y., assignor to The Texas Company, New York, N. Y., a corporation of Delaware No Drawing. Application July 20, 1956
Serial No. 598,987

8 Claims. (Cl. 252—33)

This invention relates to improved oil soluble superbasic alkaline earth metal sulfonates and method of preparing same.

Oil-soluble superbasic sulfonates contain higher quantities of alkaline earth metal than is present in the corresponding normal sulfonate salts. Therefore they are in demand where high concentrations of alkaline earth metal are desired in oleaginous vehicles such as in lubricant compositions. The key to forming such superbasic material is the use of a promoter in the reaction mixture as is exemplified by a number of prior U. S. patents, for example: 2,616,911 and 2,616,924. The promoted products shown in these patents are characteristic superbasic sulfonates.

At the present time superbasic sulfonates are broadly characterized as complexes, and the precise molecular structure of these products is not generally known. It has been postulated that these high metal content complexes are actually colloidal suspensions or dispersions of metal compounds peptized by the normal salt of the sulfonic acid in such complex.

Heretofore, the most common promoter used has been an alkylated phenol such as nonyl phenol. Other classic promoters disclosed for formation of the superbasic sulfonates have been lower molecular weight aromatic carboxylic acids, lower molecular weight sulfonic acids, cresols, xylenols, catechol, beta-naphthol, and a host of other compounds all of which can be typified as being acidic in character.

In a typical preparation of superbasic sulfonates one mixes an oil-soluble hydrocarbyl sulfonic acid and/or normal alkaline earth metal salt thereof, a basically-reacting alkaline earth metal compound such as the hydroxide, oxide, carbonate, bicarbonate, sulfide, hydrosulfide, hydride, basic carbonate, or the like in amount sufficient to establish a metal ratio in excess of one, a non-acidic vehicle for the basically-reacting alkaline earth metal compound, e. g., water, a lower alkanol or a lower alkanediol, and the promoter substance; heats the mixture to drive off substantially all the hydroxy vehicle and incidental water of neutralization; and stabilizes the resulting product by neutralizing excess alkalinity, usually by blowing with an acid anhydride gas such as carbon dioxide. Excess solids in the mixture can be filtered off prior to or after the neutralizing treatment. The resulting product can be incorporated into mineral lubricating oil, greases, cutting oils and a variety of other oleaginous vehicles. "Metal ratio" as used herein is defined as the ratio of total amount of alkaline earth metal in the mixture to the amount of alkaline earth metal theoretically combinable as a normal salt with the kind of sulfonic acid present.

I have now discovered that improved superbasic hydrocarbyl sulfonates can be made by using, instead of a phenol or a carboxylic acid, or a lower molecular weight sulfonic acid, or similar promoter substance acidic in nature, a primary aryl amine, nuclear alkylated homologues thereof, and their mixtures as the promoter substance. Such promoters are distinctly basically-reacting and will form salts with strong mineral acids such as hydrochloric. Typical promoters useful in the practice of my invention include aniline and alkylated anilines wherein at least one nuclear hydrogen atom is replaced by a radical such as methyl, ethyl, propyl, butyl, amyl, hexyl, heptyl, octyl, nonyl, decyl, hendecyl, dodecyl, tridecyl, tetradecyl, pentadecyl, or hexadecyl; alpha- or beta-naphthylamine wherein at least nuclear hydrogen atom is similarly replaced, and an anthracylamine or phenathrenylamine wherein a nuclear atom is replaced as previously described. Other suitable promoters can be similarly ring substituted di- and polyaminobenzenes, naphthalenes, anthracenes, and phenanthrenes. For ease of blending with a wide variety of oleaginous vehicles the molecular weight of the promoter is advantageously between about 149 and about 500, and the alkyl side chain (if only one present) should have at least 4 carbon atoms and preferably have from 10 to 16 carbon atoms. With polyalkylation of the aromatic radical the alkyl groups can be shorter with similar advantage, e. g., by using dibutylated aniline, nuclear dihexylated beta-naphthylamine, and the like. The most advantageous side chains are those of isoparaffinic structure, e. g., wherein the aromatic nucleus is alkylated with a lower alkene polymer such as a propylene polymer or a butylene polymer.

Ordinarily in the practice of my process I use 0.1 to 0.5 gram mol of the primary aryl amine per equivalent of sulfonic acid (i. e., per mol of monobasic sulfonic acid, per half mol of alkaline earth metal monosulfonate, or per half mol of disulfonic acid, etc.) and for efficiency and economy in the practice of my process I prefer to use about 0.25 mol of the primary amine promoter per equivalent of sulfonic acid. Instead of a monoamine one can also use a corresponding primary diamine or polyamine if desired, e. g., ring-alkylated phenylene diamines, benzidines, naphthalenediamine, or phenanthradiamine; this will reduce the molar proportion of the amine needed somewhat, but not necessarily in direct proportion to the additional number of amino nitrogen atoms available per mol of promoter. For efficiency and economy in the practice of my process I prefer to use aniline or a nuclear monoalkyl aniline wherein the alkyl group has not more than 20 carbon atoms, e. g., a $C_{12}$ alkyl aniline as the promoter. A suitable alkylated aniline can be made according to the method disclosed in British Patent No. 486,226 of 1937.

The basically-reacting alkaline earth metal compounds useful in my synthesis are those of barium, strontium, calcium and magnesium. The most effective and also desirable from a standpoint of ease of manufacture is a basically-reacting barium compound, e. g., barium hydroxide, barium hydroxide octahydrate, barium oxide or the like. The basically-reacting alkaline earth compound is dissolved or slurried in one or more non-acidic hydroxy vehicles which can be water, a lower alkanol of 1 to 3 carbon atoms, a lower alkanediol of 1 to 3 carbon atoms, or the like. I have found methanol the superior one of such vehicles for my preparation, and, accordingly, I prefer to use it. Generally about 2 to 20 mols of vehicle are used per equivalent weight of alkaline earth metal in the reaction mixture.

The hydrocarbyl sulfonic acid compound useful in my process can be the oil-soluble hydrocarbyl sulfonic acid itself and/or an alkaline earth metal salt thereof, and is preferably the sulfonic acid for efficiency and economy. In the case where an alkaline earth sulfonate is used as a starting material, it is of course advantageous to use a basically-reacting compound of the same alkaline earth metal in the preparation. Typical oil-soluble hydrocarbyl sulfonic acids for superbasing are the mahogany sulfonic acids, petrolatum sulfonic acids, mono- and poly-wax substituted benzene sulfonic acids, mono- and poly-wax substituted naphthalene sulfonic acids, paraffin wax sulfonic acids, polyisobutylene sulfonic acids, petroleum naphthene sulfonic acids, and mono- and poly-wax substituted cyclohexyl sulfonic acids.

The preparation of the superbasic sulfonate of my invention comprises: mixing the oil-soluble hydrocarbyl sulfonic acid (and/or alkaline earth metal salt thereof), sufficient of the basically-reacting alkaline earth metal compound to establish a metal ratio in excess of 1 and preferably in excess of 2 (ordinarily 3 to 4) in the mixture, the hydroxy vehicle, and the primary aryl amine promoter; stripping off substantially all said hydroxy vehicle and any incidental water of neutralization; and neutralizing residual alkalinity in the resulting mixture. The stripping of vehicle can be done at superatmospheric or subatmospheric pressures and with or without a flow of inert stripping gas and/or mechanical agitation, but, for efficiency and economy when using the preferred lighter hydroxy vehicles such as methanol, I prefer to use simple heating at substantially atmospheric pressure for this step. The maximum temperature of the stripping operation can be from 200° to 450° F. for the hydroxy vehicles generally and, with the preferred vehicles, is about 250° to 300° F.; the time of heating at the maximum temperature to remove practically all free hydroxy vehicle and water of neutralization can be from about ½ to about 8 hours, and is usually 1 to 3 hours.

Neutralization of residual alkalinity is done preferably by blowing with carbon dioxide, e. g., substantially pure carbon dioxide, air containing carbon dioxide, flue gas containing carbon dioxide, or the like. Alternatively or concurrently I can also use other acidic anhydride gases such as $SO_2$, $SO_3$, HCl, $NO_2$, $H_2S$, $CS_2$, COS, $PCl_3$, $SOCl_2$, $ClO_2$, etc., or dilute mineral acids, e. g., sulfuric, nitric, hydrochloric, or organic acids such as acetic, stearic, and the like. Advantageously the neutralization is conducted before cooling and filtering the mixture which has been stripped of hydroxy vehicle. It is advisable to neutralize at temperature above 100° C. to obtain desirably rapid rate. Ordinarily it takes ½ to 3 hours of $CO_2$ blowing to obtain substantial neutrality, i. e. a neutralization number of the reaction mixture from 0 to about 8 (alkaline). Filtration is best done subsequent to neutralization with the aid of diatomaceous silica or other similar filtering assistants. For filtration the mixture is best heated alone or thinned cold with a low boiling hydrocarbon solvent, e. g., toluene, methyl pentane or the like, to reduce the viscosity. If thinned out, the mixture can be stripped of solvent in conventional manner after filtration.

A typical lubricating composition made with my novel additives comprises 80 to 99.5 weight percent of mineral lubricating oil and 0.5 to 10 weight percent of my superbasic alkaline earth metal sulfonate. Optionally the lubricating oil can contain small amounts of other additives such as sulfurized sperm oil, zinc dialkyldithiophosphate, and viscosity index improvers such as sulfurized polyisobutylene, and the like, but need not contain such other additives to be superior to the base mineral oil itself. The outstanding performance of a lubricating oil compounded with varying proportions of a superbasic sulfonate made according to invention principles using a $C_{12}$ nuclear alkylated aniline as promoter substance is shown by the results of the MacCoull corrosion test run on lubricating oil compositions hereinafter described. (The MacCoull corrosion test measures bearing weight loss under controlled conditions and is described in the magazine "Lubrication," volume 27, page 107, September 1941, published by The Texas Company, New York, N. Y.) The tests were run at 350° F. using copper-lead bearings.

These lubricating oil compositions were made by blending a $C_{12}$ alkyl aniline-promoted superbasic barium sulfonate, zinc dialkyl dithiophosphate sold under the trade-name LZ–677 by the Lubrizol Corporation, and a high grade SAE 30 weight mineral lubricating oil base. Composition A, below, contained 2.9 weight percent of the superbasic sulfonate, 0.5 weight percent of the zinc dialkyl dithiophosphate, and 96.6 weight percent mineral lubricating oil; composition B contained 1.8 weight percent of the superbasic sulfonate, 0.2 weight percent of the zinc dialkyl dithiophosphate, and 98.0 weight percent of the mineral lubricating oil.

*Average bearing weight loss, mg.*

| Time | A | B |
| --- | --- | --- |
| 2 Hours | 0 | 0 |
| 4 Hours | 0 | 0.5 |
| 6 Hours | 0 | 0.5 |
| 8 Hours | 0 | 0.5 |
| 10 Hours | 1 | 0.5 |
| Neutralization No. (S) at 10 Hours | 0.21 | 1.1 |

By way of comparison to the performance of the above compositions, a MacCoull corrosion test using the same kind of bearings and same temperature with a composition consisting of 96.9 weight percent of the same kind of mineral lubricating oil, 0.3 weight percent of the same kind of zinc dialkyl dithiophosphate, and 2.8 weight percent of a conventional nonyl phenol-promoted superbasic barium sulfonate gave the following results:

*Average bearing weight loss, mg.*

| Time: | |
| --- | --- |
| 2 hours | 0 |
| 4 hours | 0 |
| 6 hours | 0 |
| 8 hours | 3 |
| 10 hours | 62 |
| Neutralization No. (S) at 10 hours | 6.4 |

The $C_{12}$ alkyl aniline-promoted superbasic alkaline earth metal sulfonates used in the above tests was made in the following manner: a slurry of anhydrous barium hydroxide in methanol vehicle was mixed with a blend of the promoter in petroleum sulfonic acids having average mol weight of 450 (oil-free basis), the particular sulfonic acids being sold by L. Sonneborne & Sons, Inc., under the trade-name "Petronic Acid." The quantity of promoter used was 0.25 mol per equivalent (mol) of the sulfonic acids. The proportion of barium hydroxide to sulfonic acid used was 1.875 mols per mol of sulfonic acid, this establishing a metal ratio of 3.75 in the mixture; the mixture was heated up to 150° C. and maintained there for about 2½ hours, thereby stripping out practically all the methanol and water of neutralization in the mixture. The vapor space in the reaction vessel was blanketed with nitrogen to assist in stripping. Neutralization was obtained by blowing the mixture with carbon dioxide. The novel superbased product was thinned with toluene, filtered with the assistance of a diatomaceous silica (sold under the trade-name of "Super-Cel" by the Johns-Manville Sales Corporation), and the toluene stripped off. The analytical results of the preparation are given below:

Wt. percent barium in product _____ 23.0
Metal ratio in product _____ 3.0

A superbasic barium sulfonate was made by essentially the same procedure as the one described in the foregoing example, except that the Petronic Acid was thinned with 0.5 part of a naphthene base oil having API gravity of 19° to 22° and viscosity of 300 to 324 SSU at 100° F. per part of sulfonic acid, and aniline was used as the promoter in the ratio of 0.25 mol of aniline per equivalent (mol) of the Petronic Acid. The analytical results of the preparation are given below:

Wt. percent barium in product _____ 13.5
Metal ratio in product _____ 2.15

The product was completely dispersable in mineral oil.

Obviously, many modifications and variations of the invention, as hereinbefore set forth, may be made without departing from the spirit and scope thereof, and therefore only such limitations should be imposed as are indicated in the appended claims.

I claim:

1. In a process for preparing superbasic alkaline earth metal sulfonates by heating a mixture containing at least one compound selected from the group consisting of oil-soluble hydrocarbyl sulfonic acids and alkaline earth metal salts thereof, a basically-reacting alkaline earth metal compound, and a promoter substance and neutralizing residual alkalinity in the resulting heated mixture with an acidic anhydride gas, the improvement which comprises using as the specific promoter substance 0.1 to 0.5 gram mol of at least one primary amine selected from the group consisting of aryl amines and nuclear alkylated aryl amines per equivalent of sulfonic acid in said mixture.

2. The process of claim 1 wherein said primary amine promoter is a monoalkyl aniline having an alkyl group with not more than 20 carbon atoms.

3. The process of claim 1 wherein said primary amine promoter is aniline.

4. The process of claim 1 wherein said basically-reacting alkaline earth metal compound is a barium compound.

5. The process of claim 1 wherein said primary amine is a $C_{12}$ alkyl aniline.

6. In a process for preparing superbasic alkaline earth metal sulfonates by adding a basically-reacting alkaline earth metal compound to a mixture of an oil-soluble hydrocarbyl sulfonic acid and a promoter substance to form a reaction mixture, thereafter heating said reaction mixture to remove incidental water of neutralization, and neutralizing residual alkalinity in the resultant heated mixture with an acidic anhydride gas, the improvement which comprises using as the specific promoter substance from 0.1 to 0.5 gram mol of at least one primary amine selected from the group consisting of aryl amines and nuclear alkylated aryl amines per equivalent of sulfonic acid in said mixture.

7. The process of claim 6 wherein the basically-reacting alkaline earth metal compound is barium hydroxide, the acidic anhydride gas is carbon dioxide and the primary amine is aniline.

8. The process of claim 6 wherein the basically-reacting alkaline earth metal compound is barium hydroxide, the acidic anhydride gas is carbon dioxide and the primary amine is a $C_{12}$ alkyl aniline.

References Cited in the file of this patent

UNITED STATES PATENTS

| | | |
|---|---|---|
| 2,522,519 | Kleinholz | Sept. 19, 1950 |
| 2,692,858 | Evans et al. | Oct. 26, 1954 |
| 2,727,861 | Brown et al. | Dec. 20, 1955 |
| 2,760,970 | Le Suer | Aug. 28, 1956 |